US011348158B2

(12) United States Patent
Kassaei

(10) Patent No.: US 11,348,158 B2
(45) Date of Patent: May 31, 2022

(54) SYSTEMS AND METHODS FOR AUTOMATICALLY POPULATING ECOMMERCE CART

(71) Applicant: Google LLC, Mountain View, CA (US)

(72) Inventor: Hamid Kassaei, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/766,927

(22) PCT Filed: Nov. 16, 2018

(86) PCT No.: PCT/US2018/061582
§ 371 (c)(1),
(2) Date: May 26, 2020

(87) PCT Pub. No.: WO2020/101704
PCT Pub. Date: May 22, 2020

(65) Prior Publication Data
US 2021/0019811 A1    Jan. 21, 2021

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0635* (2013.01); *G06Q 30/0205* (2013.01); *G06Q 30/0631* (2013.01); *G06Q 30/0639* (2013.01)

(58) Field of Classification Search
CPC .......... G06Q 30/0635; G06Q 30/0205; G06Q 30/0631; G06Q 30/0639
USPC ....................................... 705/26.81
See application file for complete search history.

(56) References Cited

U.S. PATENT DOCUMENTS

| 8,412,567 | B2 | 4/2013 | Evevsky | |
|---|---|---|---|---|
| 10,304,082 | B1 * | 5/2019 | Bhagat | G06Q 30/02 |
| 2009/0234722 | A1 * | 9/2009 | Evevsky | G06Q 30/02 |
| | | | | 705/14.1 |

(Continued)

OTHER PUBLICATIONS

Linda Bustos. "The 3 Ps of Cross-Selling in the Shopping Cart." Aug. 29, 2016. Retrieved from: https://www.ecommerceillustrated.com/merchandising-cart-pages/ (Year: 2016).*

(Continued)

*Primary Examiner* — Kathleen Palavecino
(74) *Attorney, Agent, or Firm* — Dority & Manning, P.A.

(57) ABSTRACT

A method for automatically populating an ecommerce cart is disclosed. The method includes receiving a request to add a product item to a shopping cart of an ecommerce shopping environment. The method includes adding the product item to the shopping cart. The method includes updating, responsive to adding the product item, a shopping cart status. The method includes determining a failure of the shopping cart status to satisfy a purchasing criteria associated with the ecommerce shopping environment. The method includes selecting, responsive to determining the failure, an additional product item based on information associated with an user account. The method includes adding the additional product item to the shopping cart.

13 Claims, 4 Drawing Sheets

(56) References Cited

U.S. PATENT DOCUMENTS

| | | | |
|---|---|---|---|
| 2015/0221016 A1* | 8/2015 | Schulz | G06Q 30/0631 |
| | | | 705/26.7 |
| 2016/0210674 A1 | 7/2016 | Allen et al. | |
| 2018/0174212 A1 | 6/2018 | Lauka et al. | |
| 2020/0027149 A1* | 1/2020 | Fox | G06Q 30/0201 |

OTHER PUBLICATIONS

Diana Salacka. "Recommended products: how to design checkout that sells?" Jun. 30, 2017. Retrieved from: https://diana-salacka-95611.medium.com/recommended-products-how-to-design-checkout-that-sells-961222f0868 (Year: 2017).*

International Search Report and Written Opinion for PCT Appln. Ser. No. PCT/US2018/061582 dated Mar. 14, 2019 (13 pages).

International Preliminary Report on Patentability, Ch. I, for PCT Appln. Ser. No. PCT/US2018/061582 dated May 27, 2021 (7 pages).

* cited by examiner

SYSTEMS AND METHODS FOR AUTOMATICALLY POPULATING ECOMMERCE CART

CROSS-REFERENCE TO RELATED APPLICATIONS

The present application is a National Stage Application, filed under 35 U.S.C. 371, of International Patent Application No. PCT/US18/061582 filed on Nov. 16, 2018 titled "SYSTEMS AND METHODS FOR AUTOMATICALLY POPULATING ECOMMERCE CART," the entirety of which is incorporated by reference herein.

BACKGROUND

Electronic commerce (ecommerce) merchants generally require a customer to satisfy a minimum threshold in terms of the amount of a total purchased product items. Otherwise, the customer may lose certain features (e.g., a free shipping feature) and/or be asked to pay one or more additional fees (e.g., a corresponding shipping fee). The customers are generally reluctant to lose the features and/or pay such additional fees, which may frequently cause the customers to terminate the transaction.

SUMMARY

Aspects of the present disclosure relate generally to systems and methods for automatically populating an ecommerce cart with one or more product items discovered based on various user information and/or merchant information.

One implementation disclosed herein is a method for populating an electronic commerce (ecommerce) shopping cart of an ecommerce shopping environment with product items. The method includes receiving, by one or more data processors and from a client device, a request to add a product item to a shopping cart of an ecommerce shopping environment. The method includes adding, by the one or more data processors, the product item to the shopping cart. The method includes updating, by the one or more data processors and responsive to adding the product item, a shopping cart status. The method includes determining, by the one or more data processors, a failure of the shopping cart status to satisfy a purchasing criteria associated with the ecommerce shopping environment. The method includes selecting, by the one or more data processors and responsive to determining the failure, an additional product item based on information associated with an user account. The method includes adding, by the one or more data processors, the additional product item to the shopping cart.

In some implementations, determining the failure includes comparing a total price associated with the shopping cart to a minimum basket price to determine that the minimum basket price exceeds the total price.

In some implementations, the method further includes determining, by the one or more processors and based on the information, an elapsed time associated with a first product item that was most recently purchased through the user account. The method further includes determining, by the one or more data processors, whether the elapsed time exceeds a depletion rate that is determined based on a number of recent purchases of the first product item through the user account. The method further includes selecting, by the one or more data processors and responsive to determining the elapsed time exceeding the depletion rate, the first product item as the additional product item.

In some implementations, selecting the additional product item is further based on merchant information received from the merchant. The merchant information indicates at least one of a popularity of the additional product item, a proximity of the additional product item to a checkout station or aisle at a brick-and-mortar store, and seasonal status information associated with the additional product item.

In some implementations, selecting the additional product item is further based on a proximity of the client device to a geographic location associated with a regional event.

In some implementations, the regional event comprises at least one of a natural disaster, a weather condition, and a man-made disaster.

In some implementations, selecting the additional product item is responsive to receiving a request from the client device to add product items to the shopping cart. The request is absent information identifying the additional product item.

In some implementations, adding the additional product item to the shopping cart causes the shopping cart status to satisfy the purchasing criteria.

In another aspect, the present disclosure is directed to a system. The system includes one or more data processors configured to receive, from a client device, a request to add a product item to a shopping cart of an ecommerce shopping environment. The one or more data processors are configured to add the product item to the shopping cart. The one or more data processors are configured to update, responsive to adding the product item, a shopping cart status. The one or more data processors are configured to determine a failure of the shopping cart status to satisfy a purchasing criteria associated with the ecommerce shopping environment. The one or more data processors are configured to select, responsive to determining the failure, an additional product item based on information associated with an user account. The one or more data processors are configured to add the additional product item to the shopping cart.

In some implementations, the one or more data processors are further configured to compare a total price associated with the shopping cart to a minimum basket price to determine that the minimum basket price exceeds the total price.

In some implementations, the one or more data processors are further configured to determine, based on the information associated with the user account, an elapsed time associated with a first product item that was most recently purchased through the user account. The one or more data processors are further configured to determine an elapsed time exceeding the depletion rate, whether the elapsed time exceeds a depletion rate that is determined based on a number of recent purchases of the first product item through the user account. The one or more data processors are further configured to select, responsive to determining the elapsed time exceeding the depletion rate, the first product item as the additional product item.

In some implementations, the one or more data processors are further configured to select the additional product item based on merchant information received from the merchant. The merchant information indicates at least one of a popularity of the additional product item, a proximity of the additional product item to a checkout station or aisle at a brick-and-mortar store, and seasonal status information associated with the additional product item.

In some implementations, the one or more data processors are further configured to select the additional product item based on a proximity of the client device to a geographic location associated with a regional event.

In some implementations, the regional event includes at least one of a natural disaster, a weather condition, and a man-made disaster.

In some implementations, the one or more data processors are further configured to select the additional product item responsive to receiving a request from the client device to add product items to the shopping cart. The request is absent information identifying the additional product item.

In some implementations, the one or more data processors are further configured to add the additional product item to the shopping cart to cause the shopping cart status to satisfy the purchasing criteria.

In some implementations, the one or more data processors are further configured to determine, responsive to adding the additional product item, a continued failure of the shopping cart status to satisfy the purchasing criteria associated with the ecommerce shopping environment. The one or more data processors are further configured to select, responsive to determining the continued failure, a third product item based on the information associated with the user account. The one or more data processors are further configured to add the third product item to the shopping cart causing the shopping cart status to satisfy the purchasing criteria.

In yet another aspect, the present disclosure is directed to a non-transitory computer-readable storage device. The non-transitory computer-readable storage device store computer-executable instructions that, when executed by one or more data processors, cause the one or more data processors to operations including: receiving, from a client device, a request to add a product item to a shopping cart of an ecommerce shopping environment; adding the product item to the shopping cart; updating, responsive to adding the product item, a shopping cart status; determining a failure of the shopping cart status to satisfy a purchasing criteria associated with the ecommerce shopping environment; selecting, responsive to determining the failure, an additional product item based on information associated with an user account; and adding the additional product item to the shopping cart.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Many online or ecommerce merchants (e.g., such as Target, Costco, Walmart) require a customer to satisfy a "minimum basket" (e.g., $25, $35) or else the merchant will charge the customer an additional fee. However, this is a major hurdle for the customer because most customers connect to a merchant's online site to purchase a single item/product and forget about all the other items that they might also need. For example, a customer may connect to a merchant's website to purchase a single bottle of shampoo costing $6.00, or maybe a two-pack is $9. Yet, after adding the shampoo to their cart, they are faced with a $5.00 fee for not meeting the merchant's minimum basket requirement. Reluctant to pay the additional fee, the customer frequently stops the transaction. Such a withdrawal of the transaction is sometimes referred to as an event of "friction in checkout." This kind of event generally exists on almost every e-commerce site owned by a merchant that is not willing to take a massive amount of losses for shipping single items, such as a $6.00 bottle of shampoo. The customers typically encounter this kind of issue because at that moment in time, the customers don't remember any of the other items that they need. Shortly after the withdrawal of the transaction (e.g., a day, a few hours), however, they may remember the other items they need.

The present disclosure provides various implementations of systems and methods to help an ecommerce customer and/or a merchant to avoid from encountering such a friction in checkout event by automatically filling or populating the customer's online shopping cart. In some implementations, the systems and methods can automatically fill the online shopping cart with just enough product item(s) to meet the merchant's minimum threshold or basket for using the feature of "free shipping." The systems and methods can select such product item(s) responsive to determining the customer's current and/or future needs, as opposed to selecting items based on the interests/needs of others. Further, the selection can be determined based on information of the particular customer and/or information about event(s) that may affect the particular customer.

Figure 1:
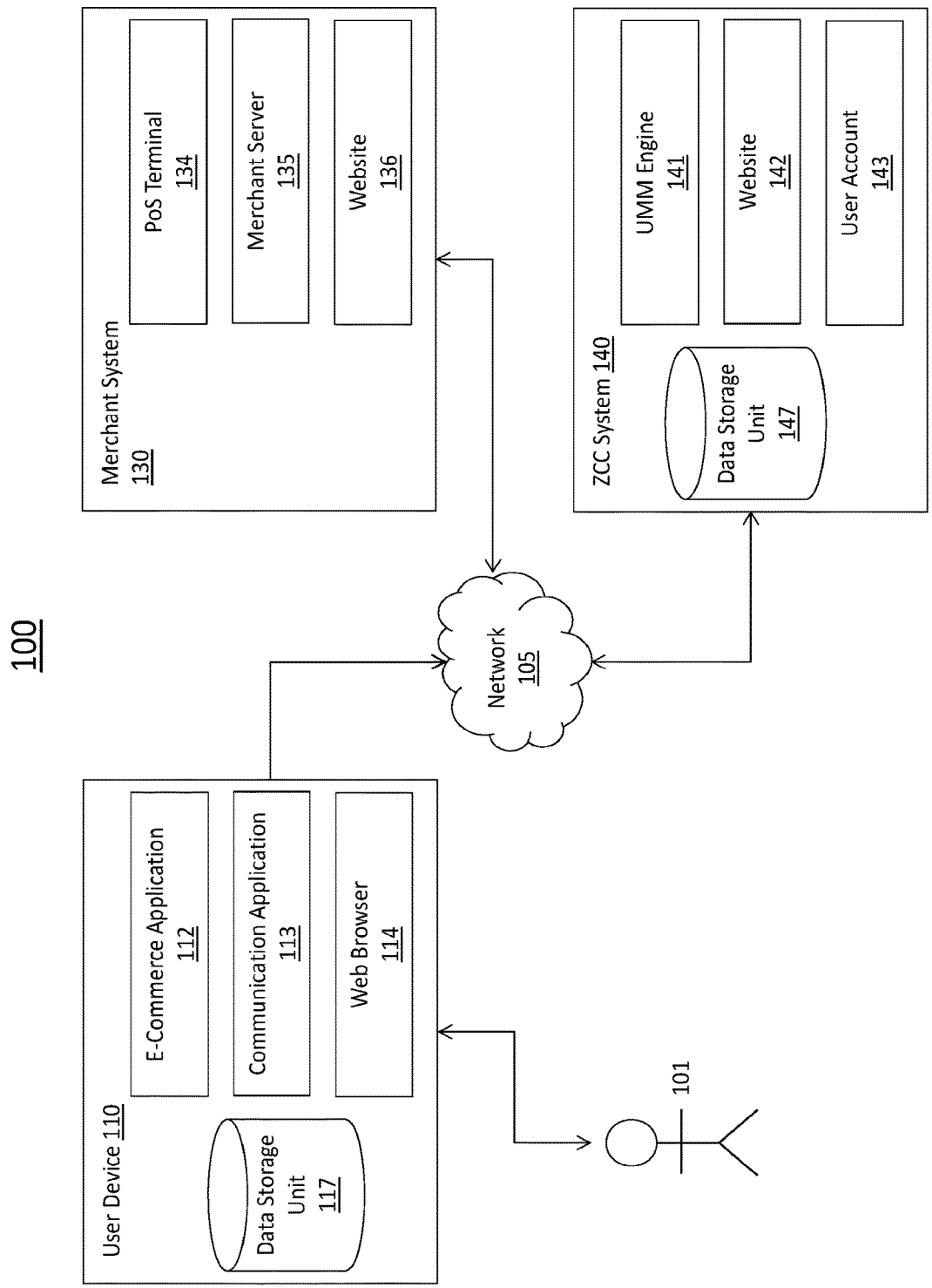
FIG. 1 depicts a block diagram of an environment for automatically populating an ecommerce cart with product items discovered based on user information and/or merchant information, in accordance with an implementation.

Referring to FIG. 1, depicted is a system or an operating environment 100 for automatically populating a shopping cart of an ecommerce shopping environment (hereinafter "ecommerce cart") with product items discovered based on user information and/or merchant information, in accordance with some implementations. As shown, the system 100 includes a user computing device 110, a merchant computing system 130, and a zero click cart (ZCC) system 140 that communicate with each other via one or more networks 105. In another example implementation, two or more of such systems (including 110, 130, and 140) or parts thereof can be integrated into the same system. In certain example implementations, a user 101 associated with the user device 110 may install an application and/or make a feature selection on the user device 110 to obtain the benefits of the methods and techniques described herein.

Each network 105 includes a wired or wireless telecommunication means by which network computing devices (including 110, 130, and 140) can exchange data. For example, each network 105 can include a local area network ("LAN"), a wide area network ("WAN"), an intranet, an Internet, a storage area network ("SAN"), a personal area network ("PAN"), a metropolitan area network ("MAN"), a wireless local area network ("WLAN"), a virtual private network ("VPN"), a cellular or other mobile communication network, Bluetooth, near field communication ("NFC"), or any combination thereof or any other appropriate architecture or system that facilitates the communication of signals, data, and/or messages. Throughout the discussion of example implementations, it should be understood that the terms "data" and "information" are used interchangeably herein to refer to text, images, audio, video, or any other form of information that can exist in a computer-based environment.

Each device/system 110, 130, and 140 includes a communication module capable of transmitting and receiving data over the network 105. For example, each device/system 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example implementation depicted in FIG. 1, the device/system 110, 130, and 140 are operated by end-users or consumers, merchant system operators, and payment processing system operators, respectively.

The user 101 can employ a communication application 113, such as a web browser application 114 or a stand-alone application, to view, download, upload, or otherwise access documents or web pages via a distributed network 105. The communication application 113 of the user device 110 can interact with web servers or other computing devices connected to the network 105. For example, the communication application 113 can interact with the user device 110, the merchant system 130, and/or the ZCC system 140. The communication application 113 may also interact with the web browser 114, which provides a user interface, for example, for accessing other devices associated with the network 105.

The user device 110 may include an ecommerce application 112. The ecommerce application 112, for example, communicates and interacts with the merchant system 130 and/or the ZCC system 140, such as via that the communication application 113 and the network 105. For example, the ecommerce application 112, for example, may be configured, based on user preferences, to obtain, receive, and communicate user information, such as account information, to the ZCC system 140. In another or additional example, the ecommerce application 112 may also be configured to recognize a merchant advertisement associated with the web browser 114.

The user device 110 may also include a ZCC application module (not shown). The ZCC application module may encompass any application, hardware, software, or process of the user device 110 that the user 101 may employ to assist the user 101 in completing a purchase transaction, or an order. For example, the ZCC application module may be configured to interact with a user account of the ZCC system 140, such as via the network 105, to automatically populate the user 101's ecommerce cart with one or more additional product items as described herein. The ZCC application module may also be configured to interact with the communication application 113 and the ecommerce application 112. In certain example implementations, the ZCC application module may be implemented as a companion application of the ecommerce application 112. As a companion application, the ZCC application module may execute and operate within the ecommerce application 112, for example. Additionally or alternatively, the ZCC application module may execute and operate independently of the ecommerce application 112.

The user device 110 may further include a data storage unit 117. The example data storage unit 117 can include one or more tangible computer-readable storage devices. The data storage unit 117 can be a component of the user device 110 or be logically coupled to the user device 110. For example, the data storage unit 117 can include on-board flash memory and/or one or more removable memory cards or removable flash memory. In certain example implementations, the data storage unit 117 may store information pertaining to the user 101 (e.g., the user 101's name, household information, calendar, shopping history with one or more merchants, location, etc.), or alternatively or additionally information pertaining to a merchant (which is sometimes referred to as "merchant information").

The merchant system 130 represents a system that offers products and/or services for the user 101 to purchase or use. For example, the merchant system 130 may be a non-physical location (e.g., a virtual merchant storefront) or a physical location (e.g., a brick and mortar store) where a user 101, such as a customer, may purchase products. In certain example implementations, the merchant system 130 includes a point-of-sale ("POS") terminal 134, such as a payment terminal at a merchant storefront that provides products. The point-of-sale terminal 134, for example, may be operated by a salesperson that enters purchase data into the point-of-sale terminal 134 to complete a purchase transaction. As used herein, "product(s)" can include, for example, any tangible or intangible products, as well as services.

The merchant system 130 may also include a merchant server 135, which in certain example implementations may represent the computer-implemented system that the merchant system 130 employs to create and assemble a website 136 and content for the website 136. The merchant server 135 may also represent the computer-implemented system that the merchant system 130 employs to transmit to purchase transaction information, such as transaction authorization requests, to acquires, financial account issuers, credit card networks, and any other entities that may be involved in (or have a commercial interest in) the purchase transaction between the user 101 and the merchant system 130. The merchant server 135, for example, may also represent the computer-implemented system that the merchant system 130 employs to create merchant information of the merchant system 130, such as products offered for sale of the merchant system 130, popular products of the merchant system 130, a layout of the merchant system 130 (when the merchant system 130 is configured as a physical store), etc.

The ZCC system 140 represents a system for automatically populating an ecommerce cart of the merchant system 130 with one or more additional product items associated with the merchant system 130. The ZCC system 140 is configured to interact with and receive data and information from the user device 110 via the network 105. For example, the ZCC system 140 receives data and information from the ecommerce application 112 on the user device 110, such as information regarding the user device 110 and/or user 101 and user inputs to one or more options that the ecommerce application 112 presents to the user 101. The ZCC system 140 is also configured to communicate with the merchant system 130, such as via the network 105, to retrieve the merchant information.

The ZCC system 140 can include a user/merchant management (UMM) engine 141, which may represent the computer-implemented system that the ZCC system 140 employs to automatically populate the ecommerce cart as described herein. For example, the UMM engine 141 may represent the computer-implemented system that the ZCC system 140 uses to receive a purchase selection (e.g., an ecommerce cart including one or more product items that the user 101 selects) directly from the user 101 or through the merchant system 130. Based on a status of the ecommerce cart, the UMM engine 141 can use various information associated with the user 101 and/or the merchant system 130 to select one or more product items to automatically populate the ecommerce cart. As such, the ecommerce cart can satisfy a criteria set by the merchant system 130. Details of the UMM engine 141 shall be discussed in further detail below with the method of FIGS. 2A and 2B.

The ZCC system 140 may also include a website 142 and a user account 143. The user 101, for example, may utilize a user interface of the website 142 to register with the ZCC system 140 and to create a record with the ZCC system 140, such as the user account 143. For example, the user 101 may associate information about the user 101 with the user account 143, which allows the ZCC system 140 to facilitate an automatic population for an ecommerce cart of the user 101, as described herein.

The ZCC system 140 may also include an accessible data storage unit 147. In certain example implementations, the data storage unit 147 stores user account information received via user 101 registrations. As such, the data storage unit 147 may store various information of the user 101, e.g., the user 101's name, household information, calendar, shopping history with one or more merchants, location, etc. Additionally or alternatively, the data storage unit 147 may store product information and/or merchant information relating to one or more purchases of the user 101. The exemplary data storage unit 147 can include one or more tangible computer-readable media. The data storage unit 147 can be stored on the ZCC system 147 or can be logically coupled to the ZCC system 147. For example, the data storage unit 147 can include on-board flash memory and/or one or more removable memory cards or removable flash memory.

Figure 2A:
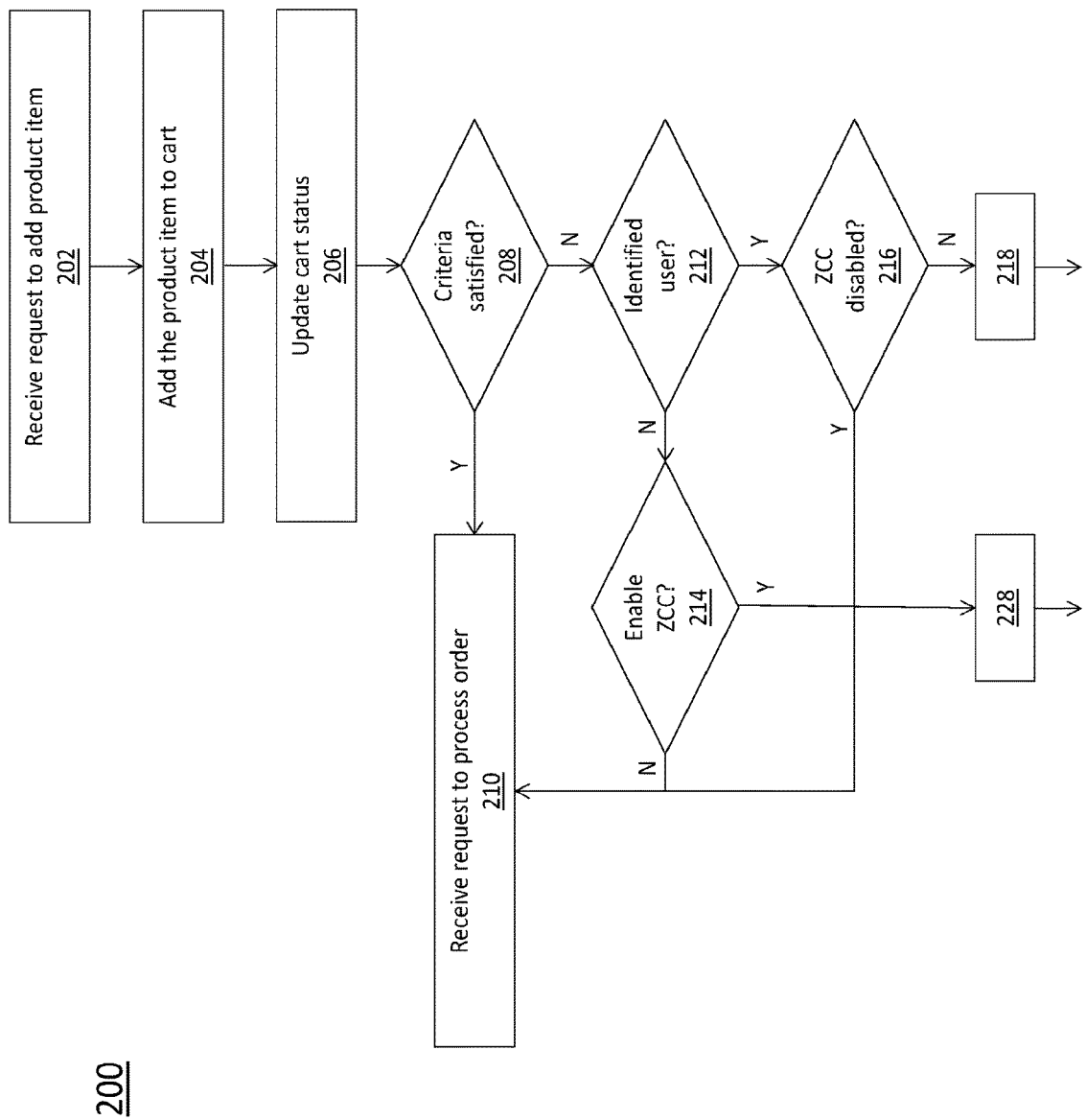
FIGS. 2A and 2B depict a flow chart of automatically populating an ecommerce cart with product items discovered based on user information and/or merchant information, in accordance with an implementation.
Figure 2B:
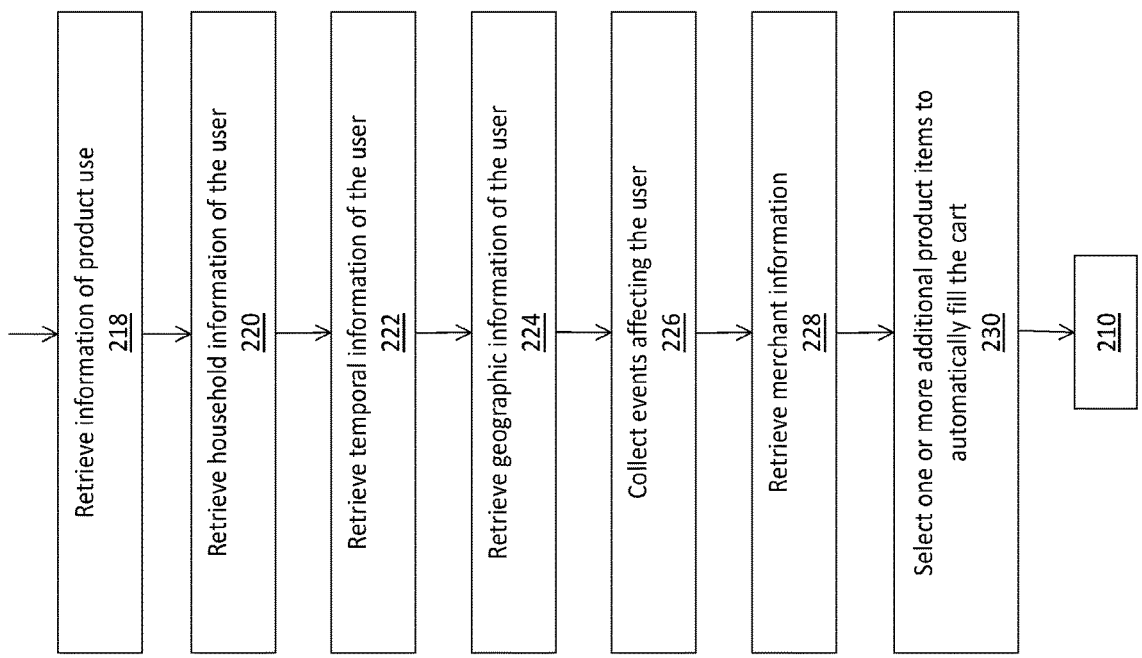

Referring to FIGS. 2A and 2B, depicted is a flow chart of one implementation of a method 200 of automatically populating an ecommerce cart with one or more product items. The functionalities or operations of the method 200 can be implemented using, or performed by, the components detailed herein in connection with FIG. 1.

In brief overview, at operation 202, an user/merchant management (UMM) engine of the zero click cart (ZCC) system or a merchant system can receive a request of an order from a user device to add one or more product items to an ecommerce cart associated with a merchant system. In response, the UMM engine or the merchant system can add the one or more product items to the ecommerce cart and update a shopping cart status of the ecommerce cart at operations 204 and 206, respectively. At operation 208, the UMM engine can communicate with the merchant system to determine whether the shopping cart status satisfies a purchasing criteria associated with the merchant system. If so, the UMM engine may receive a further request from the user device to process the order at operation 210; and if not, the UMM engine may further determine whether the user device is associated with an identified user account with the ZCC system at operation 212. If not, the UMM engine may communicate with the user device to determine whether a user of the user device would like to enable a ZCC function (e.g., an automatic population function as described herein) at operation 214; and if so, the UMM engine may further determine whether the ZCC function has been disabled at operation 216. At operation 214, if the ZCC function is enabled, the method 200 proceeds to operation 228; and if the ZCC function is not enabled, the method 200 proceeds to operation 210. At operation 216, if the ZCC function is not disabled, the method 200 proceeds to operation 218; and if the ZCC function is disabled, the method 200 proceeds to operation 210.

In response to the ZCC function being enabled, the UMM engine can perform one or more of the following operations to select one or more product items to automatically populate the ecommerce cart. For example, at operation 218, the UMM engine can retrieve information of product use. At operation 220, the UMM engine can retrieve household information of the user. At operation 222, the UMM engine can retrieve temporal information of the user. At operation 224, the UMM engine can retrieve geographic information of the user. At operation 226, the UMM engine can collect events that affect the user. At operation 228, the UMM engine can retrieve merchant information. At operation 230, the UMM engine can select one or mode additional product items to automatically populate the ecommerce cart based on at least some of the above-mentioned information. In response, the method 200 may proceed to operation 210 for the UMM engine to receive a further request from the user device to process the order.

Referring again to FIG. 2A, and in greater detail, an UMM engine of the ZCC system can receive a request of an order from a user device to add one or more product items to an ecommerce cart associated with a merchant system (operation 202). Using the system 100 of FIG. 1 as an example, the UMM engine 141, via the network 105, can directly receive the request from the user device 110 or through the merchant system 130 to perform the following operations.

For example, the user 101 may use the ecommerce application 112 to access the merchant system 130, which may be managed by a particular merchant, via the network 105. Through the ecommerce application 112, the user may be presented with a number of product items (e.g., displayed on a display device of the user device 110) sold by the merchant. In response to the user selecting one or more of the presented product items and intending to insert the product item(s) into an ecommerce cart associated with the merchant system 130, the merchant system 130, may add the selected product item(s) to the ecommerce cart (operation 204), and update the status of the ecommerce cart (operation 206). In some implementations, simultaneously with or subsequently to adding the selected product item(s) into the ecommerce cart, the merchant system may update the status of the ecommerce cart by calculating a total price of the product item(s) in the ecommerce cart, for example. Based on the updated (e.g., calculated) total price, the merchant system can determine whether the status of the ecommerce cart satisfies a purchasing criteria associated with the merchant system (operation 208). For example, the merchant system may determine a presence of failure to satisfy the criteria in response to determining that a minimum basket price exceeds the total price. The merchant system may predefine such a minimum basket price based on various factors such as, for example, inventory of the merchant system, respective types of the product items inserted into the ecommerce cart, etc. As such, the merchant system may use one of a number of predefined minimum basket prices to make the determination. In some implementations, the merchant system can communicate the determination (e.g., whether or not the failure exists) with the UMM engine. In response to receiving the determination from the merchant system, the UMM engine can determine whether the ZCC function is enabled, which shall be discussed in further detail below.

In another example, the user 101 may use the ecommerce application 112 to access the merchant system 130 so as to cause the UMM engine 141 to perform each of the above-discussed operations. For instance, while the merchant system receives the request to add product item(s) into the ecommerce cart, adds the product item(s) into the ecommerce cart accordingly, updates the cart status, and checks the presence of failure of satisfying the criteria, the ecommerce application, which may include a ZCC application module, may cause the UMM engine to communicate with the merchant system at each of the operations via the network 105 such that the UMM engine can perform a corresponding (e.g., similar) operation.

Referring again to operation 208, if the failure to satisfy the criteria does not exist, the merchant system or the ZCC system 140 may perform no further operation except for receiving a further request from the user device to process the order (operation 210). For example, the user of the user device may proceed with the order by sending a request to make a payment or simply cancel the order by closing one or more sessions. On the other hand, if the failure to satisfy the criteria does exist (e.g., the minimum basket price exceeds the total price of the ecommerce cart), the UMM engine can determine whether the user is an identified (e.g., authenticated) user to the ZCC system 140 (operation 212).

In some implementations, at operation 212, the UMM engine may determine whether the user is identified to the ZCC system based on whether the credentials provided by the user are consistent with at least one or more of the user account 143. The user may use the user device to input such credentials into one or more fields of the ecommerce application prior to, simultaneously with, or subsequently to adding the product item(s) to the ecommerce cart. If the UMM engine determines that the user is not identified to the ZCC system, the UMM engine may communicate with the user device to cause the user device to inquiry whether the user would like to enable the ZCC function (operation 214). On the other hand, if the UMM engine determines that the user is identified to the ZCC system, the UMM engine can further determine whether the user has disabled the ZCC function (operation 216).

At operation 214, an actionable item (e.g., a clickable button or icon) may be presented on the display device of the user device for the user to select. For example, the user may click the button/icon to enable the ZCC function while using the ecommerce application. In response to the ZCC function being enabled by a non-identified user (e.g., a guest), the ecommerce application may communicate with the UMM engine to retrieve various merchant information for selecting one or more additional product items to automatically populate the guest's ecommerce cart, which shall be discussed in further detail below with respect to operation 228. On the other hand, in response to the ZCC function not being enabled by the guest, the ecommerce application may communicate with the UMM engine to receive a further request from the user device to process the order (operation 210).

At operation 216, the UMM engine may further determine whether the identified user has disabled the ZCC function. In some implementations, the UMM engine may determine that the ZCC function has been disabled by detecting or otherwise receiving a notification from the user device via the network 105. The identified user may disable the ZCC function through the ecommerce application prior to, simultaneously with, or subsequently to adding the product item (s) to the ecommerce cart. If the UMM engine determines that the ZCC function has been disabled, the UMM engine may perform no further operation except for receiving the further request from the user device to process the order (operation 210). On the other hand, if the UMM engine determines that the ZCC function has not been disabled, the UMM engine may retrieve various information regarding the user and/or merchant, and based on the information, to select one or more additional product items to automatically populate the ecommerce cart, e.g., operations 218-230, which shall be discussed as follows.

At operation 218, the UMM engine can retrieve, monitor, or otherwise manage the information of product use for one or more product items in addition to the product item(s) that the identified user puts in the ecommerce cart. Based on the information of product use, the UMM engine can select the one or more product items to automatically populate the user's ecommerce cart (operation 230). In some implementations, the UMM engine can retrieve the information of product use based on one or more previous purchases through the user account of the identified user. Such information of product use may be stored in the data storage unit 147 and/or 117. Alternatively or additionally, the UMM engine can retrieve such information, which is based on one or more previous purchases through the user account of the identified user, from the merchant system.

Specifically, in response to retrieving the information of product use of the one or more product items, the UMM engine can determine an elapsed time associated with a certain product item that was most recently purchased by the identified user (e.g., through the associated user account). The UMM engine can further determine whether the elapsed time exceeds a depletion rate that is determined based on a number of recent purchases of the certain product item through the user account. In some implementations, the depletion rate may be referred to as the rate at which the user typically uses (e.g., purchases) the certain product item. Accordingly, the UMM engine can select the certain product item as one of the additional product items to populate the user's ecommerce cart.

For example, if a user most recently bought a 12 oz. bottle of shampoo two weeks ago, which can be logged by the merchant system or the UMM engine as information of product use, through accessing the data storage unit of the ZCC system or communicating with the merchant system, the UMM engine may determine that an elapsed time for the shampoo as about two weeks. Further, the UMM engine can determine a depletion rate for the shampoo (e.g., one week) based on a number of the user's previous purchases on the shampoo. In response to the UMM engine determining that elapsed time exceeds the depletion rate (in the current example), the UMM engine can select at least one bottle of shampoo as one of the additional product items to automatically populate the user's ecommerce cart.

At operation 220, the UMM engine can retrieve, monitor, or otherwise manage household information of the identified user. Based on the household information, the UMM engine can select one or more product items to automatically populate the user's ecommerce cart (operation 230). In some implementations, the UMM engine can retrieve the household information based on information of the identified user (e.g., the number of household members of the identified user, respective ages, marital status, and/or resident status of the household members of the identified user, etc.) and/or one or more previous purchases through the user account or a linked user account (e.g., a family account associated with the user account) of the identified user. Such household information may be stored in the data storage unit 147 and/or 117. Alternatively or additionally, the UMM engine can retrieve such household information from the merchant system. In some implementations, the UMM engine may take into account the household information (operation 220) while calculating the depletion rate (operation 218).

Continuing with the above example, if the user has five household members, upon retrieving such information, the UMM engine may determine that the user is likely to run out the shampoo faster than the case where the user lives alone. For example, the UMM engine may determine the depletion rate to be lower (e.g., shorter) than one week while taking into account that the user has a total of five household members. In response to determining that the elapsed time exceeds the depletion rate (shorter than one week in the current example), the UMM engine can select at least one bottle of shampoo as one of the additional product items to automatically populate the user's ecommerce cart.

At operation 222, the UMM engine can retrieve, monitor, or otherwise manage temporal information of the identified user. Based on the temporal information, the UMM engine can select one or more product items to automatically populate the user's ecommerce cart (operation 230). In some implementations, the UMM engine can retrieve the temporal information based on calendars of the identified user and/or a linked user account of the identified user (e.g., the user's and/or the linked user's birthday, an upcoming graduation party for the user and/or the linked user, a business trip for the user and/or the linked user, a planned vacation for the user and/or the linked user, etc.). Such temporal information may be stored in the data storage unit 147 and/or 117. Alternatively or additionally, the UMM engine can retrieve such temporal information from the merchant system. In some implementations, the UMM engine may take into account the temporal information (operation 222) while calculating the depletion rate (operation 218).

At operation 224, the UMM engine can retrieve, monitor, or otherwise manage geographic information of the identified user. Based on the geographic information, the UMM engine can select one or more product items to automatically populate the user's ecommerce cart (operation 230). In some implementations, the UMM engine can retrieve the geographic information based on a location of the identified user or the user device (e.g., the weather near the location of the user, the traffic near the location of the user, etc.). Such geographic information may be stored in the data storage unit 147 and/or 117. Alternatively or additionally, the UMM engine can retrieve such geographic information from the merchant system. In some implementations, the UMM engine may take into account the geographic information (operation 224) while calculating the depletion rate (operation 218).

For example, in response to the UMM engine retrieving that the weather in the location of the identified user or the user device is bad (e.g., snowy, windy, rainy, etc.), as the user may spend more time inside than outside the house, the UMM engine may determine that the user may consume more commodities (e.g., toiler papers, detergents, napkins, etc.) than usual. Accordingly, the UMM engine can select at least one of the commodities as one of the additional product items to automatically populate the user's ecommerce cart. Alternatively or additionally, the UMM engine may determine a relatively low depletion rate of the commodities while taking into account the weather. In response to determining that the elapsed time of one or more previously purchased commodities exceeds the newly determined depletion rate, the UMM engine can select at least one of the commodities as one of the additional product items to automatically populate the user's ecommerce cart.

At operation 226, the UMM engine can collect, monitor, or otherwise manage event(s) that affect the identified user. Based on the collected events, the UMM engine can select one or more product items to automatically populate the user's ecommerce cart (operation 230). In some implementations, the UMM engine can retrieve the event(s) based on the location of the identified user or the user device (e.g., a natural disaster in proximity to the location of the identified user or the user device, a weather condition in proximity to the location of the identified user or the user device, and a man-made disaster in proximity to the location of the identified user or the user device, etc.). Such collected events may be stored in the data storage unit 147 and/or 117. Alternatively or additionally, the UMM engine can collect such events from the merchant system. In some implementations, the UMM engine may take into account the events (operation 226) while calculating the depletion rate (operation 218).

For example, in response to the UMM engine determining that an earthquake may occur in the location of the identified user or the user device, the UMM engine may determine that the user may need batteries. Accordingly, the UMM engine can select the battery as one of the additional product items to automatically populate the user's ecommerce cart. Alternatively or additionally, the UMM engine may determine a relatively low depletion rate of the battery while taking into account the earthquake. In response to determining that the elapsed time of one or more previously purchased batteries exceeds the newly determined depletion rate, the UMM engine can select the battery as one of the additional product items to automatically populate the user's ecommerce cart.

At operation 228, the UMM engine can retrieve, monitor, or otherwise manage merchant information of the merchant that the identified user is shopping with. Based on the merchant information for the non-identified user and the merchant information in combination with other information retrieved in operations 218-226 for the identifier user, the UMM engine can select one or more additional product items to automatically populate the user's ecommerce cart (operation 230). In some implementations, the UMM engine can communicate with the merchant system to retrieve the merchant information, which can indicate a popularity of the additional product item, a proximity of the additional product item to a checkout station or aisle at the merchant system (when the merchant system is implemented as a brick-and-mortar store), and seasonal status information associated with the additional product item.

For example, in response to retrieving the merchant information, the UMM engine may know about the 20-30 items that the merchant categorizes as "seasonal items," know which items are popular in a specific local brick-and-mortar store, know the item they place in/near the check-out line, and/or know the layout of the store, the aisles having the most foot traffic, and which products the merchant place in those high traffic areas. Based on such merchant information, the UMM engine can select one or more additional product items to automatically populate the user's ecommerce cart.

At operation 230, the UMM engine can select one or more additional product items to automatically populate the user's ecommerce cart based on the merchant information for the non-identified user, or based on the merchant information in combination with other information retrieved in operations 218-226 for the identifier user. In response to populating the user's ecommerce cart with the selected additional product item(s), in some implementations, the UMM engine may dynamically determine whether the purchasing criteria has been satisfied. If not, the UMM engine may iteratively perform at least some of operations 218-228 to select further product item(s) to populate the user's ecommerce cart; and if so, the UMM engine may perform no further operation except for receiving request from the user (operation 210). In some implementations, the UMM engine may automatically select the one or more product items in response to receiving a subsequent request from the user device to add a product item that lacks any information identifying the one or more additional product items discovered by the ZCC function.

Figure 3:
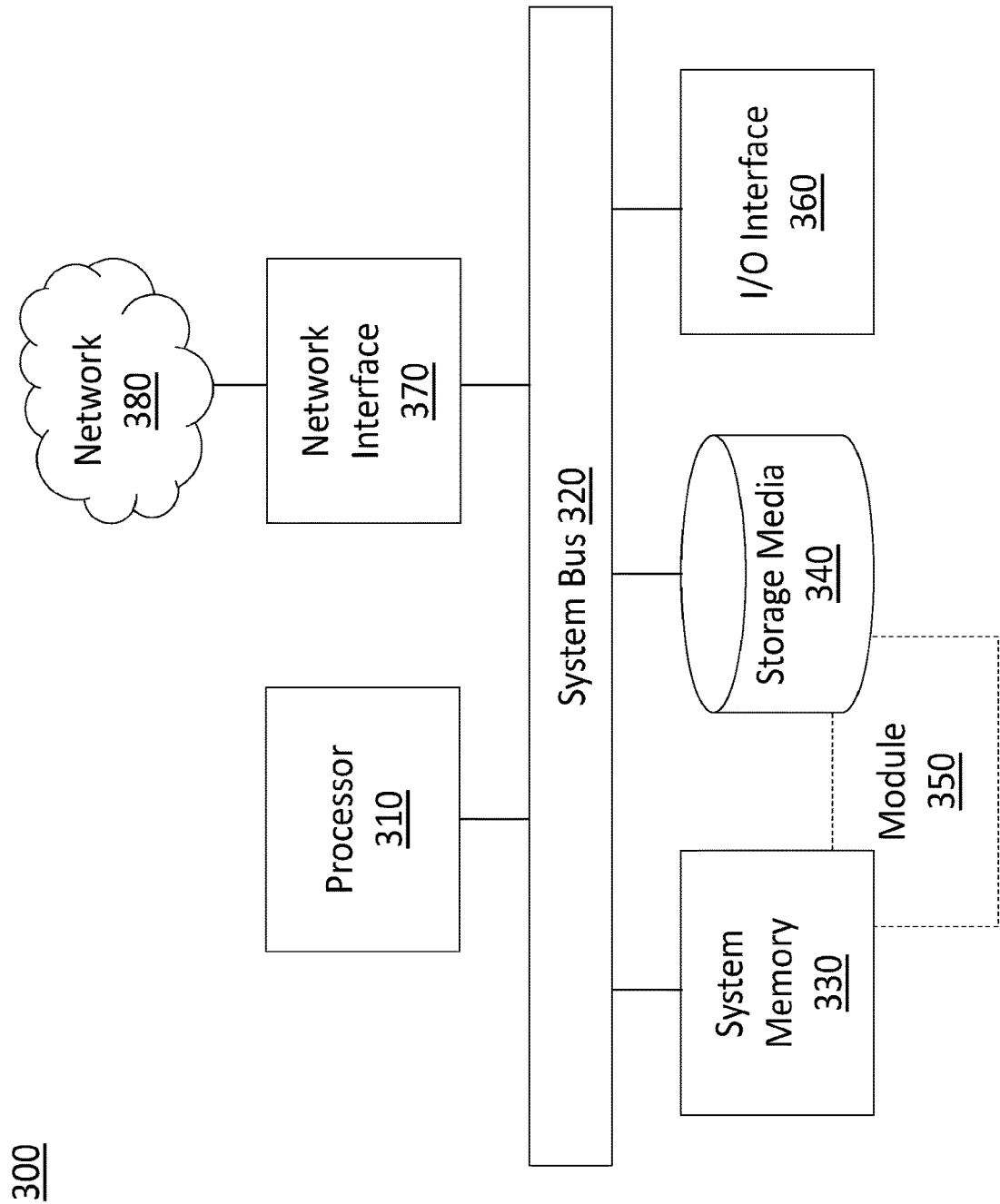
FIG. 3 is a block diagram depicting a computing machine and a module, in accordance with an implementation.

FIG. 3 depicts a computing machine 300 and a module 350 in accordance with certain example embodiments. The computing machine 300 may correspond to any of the various computers, servers, mobile devices, embedded systems, or computing systems presented herein. The module 350 may comprise one or more hardware or software elements configured to facilitate the computing machine 300 in performing the various methods and processing functions presented herein. The computing machine 300 may include various internal or attached components such as a processor 310, system bus 320, system memory 330, storage media 340, input/output interface 360, and a network interface 370 for communicating with a network 380.

The computing machine 300 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 300 may be a distributed system configured to function using multiple computing machines interconnected via a data network or bus system.

The processor 310 may be configured to execute code or instructions to perform the operations and functionality described herein, manage request flow and address mappings, and to perform calculations and generate commands. The processor 310 may be configured to monitor and control the operation of the components in the computing machine 300. The processor 310 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 310 may be a single processing unit, multiple processing units, a single processing core, multiple processing cores, special purpose processing cores, co-processors, or any combination thereof. According to certain example embodiments, the processor 310 along with other components of the computing machine 300 may be a virtualized computing machine executing within one or more other computing machines.

The system memory 330 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 330 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 330. The system memory 330 may be implemented using a single memory module or multiple memory modules. While the system memory 330 is depicted as being part of the computing machine 300, one skilled in the art will recognize that the system memory 330 may be separate from the computing machine 300 without departing from the scope of the subject technology. It should also be appreciated that the system memory 330 may include, or operate in conjunction with, a non-volatile storage device such as the storage media 340.

The storage media 340 may include a hard disk, a floppy disk, a compact disc read only memory ("CD-ROM"), a digital versatile disc ("DVD"), a Blu-ray disc, a magnetic tape, a flash memory, other non-volatile memory device, a solid-state drive ("SSD"), any magnetic storage device, any optical storage device, any electrical storage device, any semiconductor storage device, any physical-based storage device, any other data storage device, or any combination or multiplicity thereof. The storage media 340 may store one or more operating systems, application programs and program modules such as module 350, data, or any other information. The storage media 340 may be part of, or connected to, the computing machine 300. The storage media 340 may also be part of one or more other computing machines that are in communication with the computing machine 300 such as servers, database servers, cloud storage, network attached storage, and so forth.

The module 350 may comprise one or more hardware or software elements configured to facilitate the computing machine 300 with performing the various methods and processing functions presented herein. The module 350 may include one or more sequences of instructions stored as software or firmware in association with the system memory 330, the storage media 340, or both. The storage media 340 may therefore represent examples of machine or computer readable media on which instructions or code may be stored for execution by the processor 310. Machine or computer readable media may generally refer to any medium or media used to provide instructions to the processor 310. Such machine or computer readable media associated with the module 350 may comprise a computer software product. It should be appreciated that a computer software product comprising the module 350 may also be associated with one or more processes or methods for delivering the module 350 to the computing machine 300 via the network 380, any signal-bearing medium, or any other communication or delivery technology. The module 350 may also comprise hardware circuits or information for configuring hardware circuits such as microcode or configuration information for an FPGA or other PLD.

The input/output ("I/O") interface 360 may be configured to couple to one or more external devices, to receive data from the one or more external devices, and to send data to the one or more external devices. Such external devices along with the various internal devices may also be known as peripheral devices. The I/O interface 360 may include both electrical and physical connections for operably coupling the various peripheral devices to the computing machine 300 or the processor 310. The I/O interface 360 may be configured to communicate data, addresses, and control signals between the peripheral devices, the computing machine 300, or the processor 310. The I/O interface 360 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 360 may be configured to implement only one interface or bus technology. Alternatively, the I/O interface 360 may be configured to implement multiple interfaces or bus technologies. The I/O interface 360 may be configured as part of, all of, or to operate in conjunction with, the system bus 320. The I/O interface 360 may include one or more buffers for buffering transmissions between one or more external devices, internal devices, the computing machine 300, or the processor 310.

The I/O interface 360 may couple the computing machine 300 to various input devices including mice, touch-screens, scanners, electronic digitizers, sensors, receivers, touchpads, trackballs, cameras, microphones, keyboards, any other pointing devices, or any combinations thereof. The I/O interface 360 may couple the computing machine 300 to various output devices including video displays, speakers, printers, projectors, tactile feedback devices, automation control, robotic components, actuators, motors, fans, solenoids, valves, pumps, transmitters, signal emitters, lights, and so forth.

The computing machine 300 may operate in a networked environment using logical connections through the network interface 370 to one or more other systems or computing machines across the network 380. The network 380 may include wide area networks (WAN), local area networks (LAN), intranets, the Internet, wireless access networks, wired networks, mobile networks, telephone networks, optical networks, or combinations thereof. The network 380 may be packet switched, circuit switched, of any topology, and may use any communication protocol. Communication links within the network 380 may involve various digital or an analog communication media such as fiber optic cables, free-space optics, waveguides, electrical conductors, wireless links, antennas, radio-frequency communications, and so forth.

The processor 310 may be connected to the other elements of the computing machine 300 or the various peripherals discussed herein through the system bus 320. It should be appreciated that the system bus 320 may be within the processor 310, outside the processor 310, or both. According to some embodiments, any of the processor 310, the other elements of the computing machine 300, or the various peripherals discussed herein may be integrated into a single device such as a system on chip ("SOC"), system on package ("SOP"), or ASIC device.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a System on a Chip (SOC), a field programmable gate array (FPGA), or an application specific integrated circuit (ASIC).

Processors suitable for the execution of a computer program include both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a cathode ray tube (CRT), liquid crystal display (LCD), organic light emitting diode (OLED), thin-film transistor (TFT), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending webpages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Communication networks can include various combinations of a local area network ("LAN"), a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method comprising:
   maintaining, by one or more processors, in one or more data structures, one or more events associated with one or more geographic locations;
   receiving, by the one or more processors, from a client device, a request to add a first product to an ecommerce shopping cart;
   adding, by the one or more processors, the first product to the ecommerce shopping cart;
   identifying, by the one or more processors, a failure of the ecommerce shopping cart to satisfy a purchasing criteria;
   in response to identifying the failure of the ecommerce shopping cart to satisfy the purchasing criteria:
      identifying, by the one or more processors, a location of the client device;
      identifying, by the one or more processors, in the one or more data structures, an event of the one or more events associated with a geographic location of the one or more geographic locations satisfying a proximity threshold to the location of the client device;
      selecting, by the one or more processors, a second product for the ecommerce shopping cart to satisfy the purchasing criteria based on the identified event;
      identifying, by the one or more processors, whether an elapsed time since purchasing the second product through a user account associated with the client device satisfies a depletion rate of the second product based on household information associated with the user account; and
      adding, by the one or more processors, responsive to identifying that the elapsed time satisfies the depletion rate, the second product to the ecommerce shopping cart, wherein the ecommerce shopping cart including the second product is displayed on the client device to indicate that the ecommerce shopping cart satisfies the purchasing criteria.

2. The method of claim 1, wherein identifying the failure comprises comparing a total price associated with the ecommerce shopping cart to a minimum basket price to determine that the minimum basket price exceeds the total price.

3. The method of claim 1, wherein selecting the second product is further based on merchant information indicating at least one of a popularity of the second product, a proximity of the second product to a checkout station or aisle at a brick-and-mortar store, and seasonal status information associated with the second product.

4. The method of claim 1, wherein the identified event comprises at least one of a natural disaster, a weather condition, and a man-made disaster.

5. The method of claim 1, wherein selecting the second product is based on the identified event and responsive to receiving an additional request from the client device to add additional product to the ecommerce shopping cart, the additional request absent additional information identifying the second product.

6. The method of claim 1, wherein adding the second product item comprises:
   adding, by the one or more processors, responsive to identifying that the elapsed time satisfies the depletion rate, the second product to the ecommerce shopping cart;
   determining, by the one or more processors and responsive to adding the second product, a continued failure of the ecommerce shopping cart to satisfy the purchasing criteria associated with the ecommerce shopping cart;
   selecting, by the one or more processors and responsive to determining the continued failure, a third product based on the household information associated with the user account; and
   adding, by the one or more processors, the third product to the ecommerce shopping cart causing the ecommerce shopping cart to satisfy the purchasing criteria, wherein the ecommerce shopping cart including the second product and the third product is displayed on the client device to indicate that the ecommerce shopping cart satisfies the purchasing criteria.

7. A system comprising:
   one or more processors configured to:
      maintain, in one or more data structures, one or more events associated with one or more geographic locations;
      receive, from a client device, a request to add a first product to an ecommerce shopping cart;
      add the first product to the ecommerce shopping cart;
      identify a failure of the ecommerce shopping cart to satisfy a purchasing criteria;
      in response to identifying the failure of the ecommerce shopping cart to satisfy the purchasing criteria:
         identify responsive to identifying the failure, a location of the client device;
         identify in the one or more data structures, an event of the one or more events associated with a geographic location of the one or more geographic locations satisfying a proximity threshold to the location of the client device;
         select a second product for the ecommerce shopping cart to satisfy the purchasing criteria based on the identified event;
         identify whether an elapsed time since purchasing the second product through a user account associated with the client device satisfies a depletion rate of the second product based on household information associated with the user account; and
         add, responsive to identifying that the elapsed time satisfies the depletion rate, the second product to the ecommerce shopping cart, wherein the ecommerce shopping cart including the second product is displayed on the client device to indicate that the ecommerce shopping cart satisfies the purchasing criteria.

8. The system of claim 7, wherein the one or more processors further configured to:
   compare a total price associated with the ecommerce shopping cart to a minimum basket price to determine that the minimum basket price exceeds the total price.

9. The system of claim 7, wherein the one or more processors further configured to:
   select the second product based on merchant information indicating at least one of a popularity of the second product, a proximity of the second product to a checkout station or aisle at a brick-and-mortar store, and seasonal status information associated with the second product.

10. The system of claim 7, wherein the identified event comprises at least one of a natural disaster, a weather condition, and a man-made disaster.

11. The system of claim 7, wherein selecting the second product is based on the identified event and responsive to receiving an additional request from the client device to add additional product to the ecommerce shopping cart, the additional request absent additional information identifying the second product.

12. The system of claim 7, wherein adding the second product comprises:
   add, responsive to identifying that the elapsed time satisfies the depletion rate, the second product to the ecommerce shopping cart;
   determine, responsive to adding the second product, a continued failure of the ecommerce shopping cart to satisfy the purchasing criteria associated with the ecommerce shopping cart;
   select, responsive to determining the continued failure, a third product based on the household information associated with the user account; and
   add the third product to the ecommerce shopping cart causing the ecommerce shopping cart to satisfy the purchasing criteria, wherein the ecommerce shopping cart including the second product and the third product is displayed on the client device to indicate that the ecommerce shopping cart satisfies the purchasing criteria.

13. A non-transitory computer-readable storage device storing computer-executable instructions that, when executed by one or more processors, cause the one or more processors to perform operations comprising:
   maintaining, in one or more data structures, one or more events associated with one or more geographic locations;
   receiving from a client device, a request to add a first product to an ecommerce shopping cart;
   adding the first product to the ecommerce shopping cart;
   identifying a failure of the ecommerce shopping cart to satisfy a purchasing criteria;
   in response to identifying the failure of the ecommerce shopping cart to satisfy the purchasing criteria:
   identifying a location of the client device;
   identifying, in the one or more data structures, an event of the one or more events associated with a geographic location of the one or more geographic locations satisfying a proximity threshold to the location of the client device;
   selecting a second product for the ecommerce shopping cart to satisfy the purchasing criteria based on the identified event;
   identifying whether an elapsed time since purchasing the second product through a user account associated with the client device satisfies a depletion rate of the second product based on household information associated with the user account; and adding responsive to identifying that the elapsed time satisfies the depletion rate, the second product to the ecommerce shopping cart, wherein the ecommerce shopping cart including the second product is displayed on the client device to indicate that the ecommerce shopping cart satisfies the purchasing criteria.

* * * * *